(12) United States Patent
Pfister (10) Patent No.: US 12,347,059 B2
(45) Date of Patent: Jul. 1, 2025

(54) PROVIDING A CORRECTED DATASET

(71) Applicant: Siemens Healthcare GmbH, Erlangen (DE)

(72) Inventor: Marcus Pfister, Bubenreuth (DE)

(73) Assignee: Siemens Heathcare GmbH, Erlangen (DE)

( * ) Notice: Subject to any disclaimer, the term of this patent is extended or adjusted under 35 U.S.C. 154(b) by 492 days.

(21) Appl. No.: 17/700,457

(22) Filed: Mar. 21, 2022

(65) Prior Publication Data
US 2022/0301100 A1    Sep. 22, 2022

(30) Foreign Application Priority Data
Mar. 22, 2021 (DE) .................... 10 2021 202 753.9

(51) Int. Cl.
*G06T 3/18* (2024.01)
*G06T 7/00* (2017.01)
*G06T 7/149* (2017.01)

(52) U.S. Cl.
CPC .............. *G06T 3/18* (2024.01); *G06T 7/0012* (2013.01); *G06T 7/149* (2017.01); *G06T 2207/10072* (2013.01)

(58) Field of Classification Search
CPC .......... G06T 3/18; G06T 7/149; G06T 7/0012
See application file for complete search history.

(56) References Cited

U.S. PATENT DOCUMENTS

| 9,600,138 B2 * | 3/2017 | Thomas | G06T 19/20 |
| 2007/0116334 A1 * | 5/2007 | Fidrich | G06T 7/12 |
| | | | 382/128 |

(Continued)

FOREIGN PATENT DOCUMENTS

DE    102010012621 A1    9/2011

OTHER PUBLICATIONS

"Corindus CorPath GRX for PCI and PVI Procedures—How it works", https://www.corindus.com/corpath-grx/how-it-works (abgerufen am Aug. 17, 2020).

(Continued)

*Primary Examiner* — David Bilodeau
(74) *Attorney, Agent, or Firm* — Lempia Summerfield Katz LLC (57) ABSTRACT

A method for providing a corrected dataset includes receiving a preoperative dataset containing an image and/or a model of an examination region of an examination subject. Length information is received. At least a part of a medical object is arranged intraoperatively in the examination region. The length information includes information relating to a length of the part of the medical object arranged in the examination region. First positioning information relating to a virtual positioning of a predefined section of the part of the medical object arranged in the examination region is determined based on the preoperative dataset and the length information. The method includes receiving and/or determining second positioning information relating to a real positioning of the predefined section. A transformation rule for minimizing a deviation between the first and second positioning information is determined, and the corrected dataset is generated by applying the transformation rule to the preoperative dataset.

17 Claims, 6 Drawing Sheets

(56) References Cited

U.S. PATENT DOCUMENTS

| | | | |
|---|---|---|---|
| 2011/0235876 A1 | 9/2011 | Pfister et al. | |
| 2015/0094567 A1 | 4/2015 | Pfister | |
| 2017/0281145 A1 | 10/2017 | Crawford et al. | |
| 2018/0279974 A1* | 10/2018 | Breininger | A61B 6/03 |
| 2019/0180880 A1* | 6/2019 | Lavi | G16H 50/50 |
| 2019/0231436 A1* | 8/2019 | Panse | A61B 34/30 |
| 2020/0078133 A1* | 3/2020 | Flossmann | G06T 7/70 |
| 2020/0359884 A1* | 11/2020 | Swisher | G02B 27/017 |
| 2022/0156925 A1* | 5/2022 | Bydlon | G06T 7/149 |
| 2022/0343494 A1* | 10/2022 | Dhatt | A61B 8/467 |

OTHER PUBLICATIONS

Breininger, Katharina et al. "3D-Reconstruction of Stiff Wires from a Single Monoplane X-Ray Image", 2019, Bildverarbeitung für die Medizin, pp. 172-177.

Dumenil, Aurelien et al: "Finite-element-based matching of pre-and intraoperative data for image-guided endovascular aneurysm repair"; IEEE Transactions on Biomedical Engineering; Year: 2012, vol. 60, No. 5, pp. 1353-1362; DOI: 10.1109/TBME.2012.2235440.

\* cited by examiner

PROVIDING A CORRECTED DATASET

This application claims the benefit of German Patent Application No. DE 10 2021 202 753.9, filed on Mar. 22, 2021, which is hereby incorporated by reference in its entirety.

BACKGROUND

The present embodiments relate to a method for providing a corrected dataset, a system, and a computer program product.

During the treatment and/or investigation of changes to vessels of an examination subject, medical objects (e.g., a guide wire and/or a catheter) are often introduced into a vessel. For the imaging-based real-time monitoring of the medical object in the vessel, X-ray projection images are frequently acquired following application of contrast agents (e.g., iodine-containing contrast agents). Often, for example, endovascular aortic repairs (EVAR) are carried out on angiography systems while the procedure is monitored by fluoroscopy. A saving in terms of the amount of contrast agent to be applied may often be achieved by a registration and subsequent overlaying of a preoperatively acquired image dataset with one of the X-ray projection images.

A disadvantage with this approach, however, is that a deformation of the vessel and/or of surrounding tissue may often occur as a result of the medical object being disposed in the vessel. The deformation is not imaged in the preoperative image dataset. In order to correct the deformation in the preoperative image dataset, use is often made of a deformation model that is based on a material parameter of the medical object, and/or a time-consuming manual adjustment is carried out based on the multiple X-ray projection images acquired when contrast agent has been applied. The correction of the preoperative image dataset in this situation is often insufficiently accurate (e.g., at ostia and/or vascular bifurcations).

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved intraoperative acquisition and/or imaging of an anatomical structure having a medical object arranged therein is provided.

The present embodiments relate, in a first aspect, to a method for providing a corrected dataset. This entails receiving a preoperative dataset containing an image and/or a model of an examination region of an examination subject. Length information is also received. At the same time, at least a part of a medical object is arranged intraoperatively in the examination region. The length information further includes information relating to a length of the part of the medical object arranged in the examination region. In addition, first positioning information relating to a virtual positioning of a predefined section of the part of the medical object arranged in the examination region is determined based on the preoperative dataset and the length information. Also, second positioning information relating to a real positioning of the predefined section is received and/or determined. Further, a transformation rule for minimizing a deviation between the first positioning information and the second positioning information is determined. After this, the corrected dataset is generated by applying the transformation rule to the preoperative dataset. The corrected dataset is also provided.

The above-described acts may be carried out consecutively and/or at least partially concurrently. Further, the above-described acts may be performed repeatedly in the event of a change in the arrangement of the part of the medical object arranged in the examination region (e.g., a change in the length information).

The examination subject may be, for example, a human patient and/or an animal patient and/or an examination phantom (e.g., a vessel phantom). Further, the examination region may describe a spatial section of the examination subject that may include, for example, an anatomical structure of the examination subject (e.g., a hollow organ). In this case, the hollow organ may be embodied, for example, as a vessel segment (e.g., an artery and/or a vein, and/or a vessel tree and/or a heart, and/or a lung, and/or a liver).

The medical object may be embodied, for example, as a surgical and/or diagnostic instrument (e.g., an elongate surgical and/or diagnostic instrument). For example, the medical object may be flexible and/or rigid, at least in sections. The medical object may be embodied, for example, as a catheter and/or an endoscope and/or a guide wire. Further, the medical object may be introduced intraoperatively (e.g., by an introducer sheath) at least partially into the examination subject such that the predefined section of the medical object is arranged inside of the examination subject (e.g., in the hollow organ). The part of the medical object arranged in the examination region may, for example, describe the spatial section of the medical object between a distal end section (e.g., a tip) of the medical object and the introducer sheath. Further, the predefined section may describe a section (e.g., distal section) of the medical object. The predefined section may be predetermined as a function of the medical object and/or of the examination region and/or be defined by an operator (e.g., using a corresponding user input).

The receiving of the preoperative dataset and/or of the length information and/or of the second positioning information may, for example, include an acquisition thereof and/or a readout thereof from a computer-readable data memory and/or a receiving thereof from a data storage unit (e.g., a database).

The preoperative dataset may, for example, be provided by a provisioning unit of a medical imaging device. In this case, the medical imaging device for acquiring the preoperative dataset may be embodied, for example, as a computed tomography system (CT) and/or magnetic resonance system (MRT) and/or medical X-ray device and/or sonography system and/or positron-emission tomography system (PET). For example, the preoperative dataset may have been acquired by a CT angiography scan.

In one embodiment, the preoperative dataset may include a two-dimensional (2D) and/or three-dimensional (3D) image (e.g., time-resolved) of the examination region (e.g., of the hollow organ). The preoperative dataset may in this case image the examination region preoperatively (e.g., with respect to time) before the medical object has been introduced into the examination region and/or been arranged therein. For example, the preoperative dataset may contain a post-contrast and/or segmented image of the examination region (e.g., of the hollow organ).

Alternatively or in addition, the preoperative dataset may include a 2D and/or 3D model (e.g., a centerline model and/or a volume model, such as a volume mesh model) of the examination region (e.g., of the hollow organ). The preoperative dataset may be registered with a coordinate system of the examination subject and/or of the medical imaging device for acquiring the preoperative dataset. The preoperative dataset may contain an image and/or a model of a spatial course of the hollow organ in the examination region. The preoperative dataset may also contain metadata that may, for example, include information relating to an acquisition parameter and/or operating parameter of the medical imaging device for acquiring the preoperative dataset.

The length information may include information relating to a length (e.g., current length) of the part of the medical object arranged in the examination region. In this case, the length information may, for example, include a unit of length beginning at an insertion point of the medical object into the examination subject (e.g., the introducer sheath) along a longitudinal extension direction of the medical object. The length information may further include information relating to a virtual positioning of the insertion point of the medical object (e.g., the introducer sheath) in the preoperative dataset.

The determining of the first positioning information may include an arranging of a virtual representation (e.g., of a 2D and/or 3D model) of the medical object in the preoperative dataset (e.g., starting from the virtual positioning of the entry point of the medical object in the preoperative dataset). In this case, the first positioning information relating to the virtual positioning of the predefined section of the medical object may be determined at least in relation to the preoperative dataset. If the preoperative dataset is registered with a coordinate system of the examination subject and/or of the medical imaging device for acquiring the preoperative dataset, the virtual positioning of the predefined section may be further determined in relation to the respective coordinate system. The virtual positioning of the predefined section may in this case denote a model-based and/or computationally determined positioning. In this case, the first positioning information may include information relating to a virtual position and/or orientation and/or pose (e.g., current) of the predefined section in the preoperative dataset.

The second positioning information may include information relating to a spatial position and/or orientation and/or pose (e.g., current) of the predefined section in the examination region of the examination subject. For example, the second positioning information may describe the spatial positioning (e.g., current) of the predefined section in the coordinate system of the examination subject. In this case, the second positioning information may be received by an acquisition unit for detecting the real positioning of the predefined section. Alternatively or in addition, the second positioning information may be determined based on an intraoperative dataset. The real positioning of the predefined section may in this case denote a measured positioning and/or a positioning determined by imaging.

The transformation rule may include information relating to a rigid and/or non-rigid and/or global and/or local and/or regional transformation (e.g., deformation) of the preoperative dataset. In one embodiment, the determining of the transformation rule may include an optimization (e.g., a cost-minimizing optimization). The deviation between the first positioning information and the second positioning information is minimized by applying the deformation rule to the preoperative dataset. The optimization may in this case include an adjustment (e.g., iterative adjustment) of the transformation rule. In this case, the first positioning information may be determined repeatedly (e.g., based on the length information and an intermediate dataset). The intermediate dataset is generated by applying the transformation rule current at the present time to the preoperative dataset. Further, the optimization may be based, for example, on a cost function (e.g., on a cost function that is to be minimized). The cost function is determined as a function of the deviation between the first positioning information and the second positioning information.

The generation of the corrected dataset may include applying the determined (e.g., most-recently determined) transformation rule to the preoperative dataset. The corrected dataset may be provided in the process. Further, the providing of the corrected dataset may include, for example, a storing thereof on a computer-readable storage medium and/or a displaying thereof on the visualization unit and/or a transferring thereof to a provisioning unit. For example, a graphical representation of the corrected dataset may be displayed on the visualization unit.

The embodiment may enable a precise deformation correction of the preoperative dataset that is at the same time efficient in terms of X-ray dose. Although the method describes the providing of a corrected dataset for a medical object at least partially arranged in the examination region, the method may also be applied to the providing of a corrected dataset for a plurality of medical objects (e.g., identical or different) at least partially arranged in the examination region (e.g., simultaneously).

In a further embodiment of the method, the preoperative dataset may contain planning information relating to a planned movement trajectory of the medical object in the examination region. Further, the first positioning information may be determined also based on the planning information.

The planning information may, for example, include information relating to a spatial course of a planned movement trajectory (e.g., a path planning) of the medical object (e.g., of the predefined section) in the examination region (e.g., the hollow organ). In this case, the planning information may describe the spatial course of the planned movement trajectory starting from the virtual positioning of the entry point of the medical object in the preoperative dataset. In one embodiment, the determining of the first positioning information may include an arranging of the virtual representation of the medical object in accordance with the unit of length along the planned movement trajectory in the preoperative dataset. In this case, the virtual positioning of the predefined section may describe a position and/or orientation and/or pose of the predefined section of the medical object on the planned movement trajectory starting from the virtual positioning of the entry point in accordance with the unit of length.

By this, it is possible to realize a computationally efficient determination of the transformation rule and/or generation of the corrected dataset.

In a further embodiment of the method, a positioning of the predefined section of the medical object in the examination region by a mover device may have taken place prior to the start of the method. Further, the mover device may be embodied to halt and/or to move the medical object at least partially arranged in the mover device. In this case, the length information may be provided by the mover device.

In one embodiment, the mover device may be a robotic device that is embodied to allow remote manipulation of the medical object (e.g., a catheter robot). The mover device may be arranged outside of the examination subject. Further, the mover device may include a securing element (e.g., a movable and/or displaceable securing element). The mover device may also include a cassette element that is embodied to accommodate at least a part of the medical object. The mover device may also include a mover element that is fixedly mounted on the securing element (e.g., a stand and/or a robotic arm). The securing element may also be embodied to secure the mover element to a patient support and positioning device. In addition, the mover element include at least one actuator element (e.g., an electric motor) that is controllable by a provisioning unit. In one embodiment, the cassette element may be couplable (e.g., mechanically and/or electromagnetically and/or pneumatically) to the mover element (e.g., to the at least one actuator element). In this case, the cassette element may also include at least one transmission element that is movable as a result of the coupling between the cassette element and the mover element (e.g., the at least one actuator element). For example, the at least one transmission element may be movably coupled to the at least one actuator element. In one embodiment, the transmission element is embodied to transmit a movement of the actuator element to the medical object such that the medical object is moved along a longitudinal extension direction of the medical object and/or that the medical object is rotated around its longitudinal extension direction. The at least one transmission element may include, for example, a roller and/or drum and/or shield and/or shearing plate. The transmission element may be further embodied to halt the medical object (e.g., in a stable manner) by transmitting a force. The halting of the medical object may, for example, include a stationary positioning of the medical object in relation to the mover device.

The mover element may include a plurality of actuator elements (e.g., independently controllable actuator elements). The cassette element may further include a plurality of transmission elements (e.g., at least one movably coupled transmission element for each of the actuator elements). This may facilitate movement (e.g., independent and/or simultaneous movement) of the medical object along different degrees of freedom.

In addition, the mover device may include a sensor unit that is embodied to detect a relative movement of the medical object relative to the mover device. In this case, the sensor unit may include, for example, an encoder (e.g., a wheel encoder and/or a roller encoder) and/or an optical sensor (e.g., a barcode scanner and/or a laser scanner and/or a camera) and/or an electromagnetic sensor. For example, the sensor unit may be arranged at least partially integrated into the mover element (e.g., the at least one actuator element) and/or into the cassette element (e.g., the at least one transmission element). The sensor unit may be embodied, for example, to detect the relative movement of the medical object by detecting the medical object relative to the mover device. Alternatively or in addition, the sensor unit may be embodied to detect a movement and/or change in position of components of the mover device. The components are movably coupled to the medical object (e.g., the at least one actuator element and/or the at least one transmission element).

In one embodiment, the mover device (e.g., the sensor unit) may be embodied to determine the length of the part of the medical object arranged in the examination region based on the detected relative movement of the medical object relative to the mover device. In this case, the detected relative movement may include a range between an initial positioning of the predefined section at the insertion point (e.g., at the introducer sheath) away toward the spatial positioning (e.g., current) of the predefined section in the examination region (e.g., the hollow organ). For example, a positioning (e.g., a movement) of the predefined section of the medical object from the initial positioning into the spatial positioning (e.g., current) in the examination region may have taken place prior to the start of the method.

In one embodiment, the mover device may be further embodied to provide the length information containing the information relating to the length of the part of the medical object arranged in the examination region.

The embodiment may enable a precise acquisition and provision of the length information. By this, it is further possible to realize an improved correction of the preoperative dataset as a result of applying the transformation rule.

In a further embodiment of the method, the preoperative dataset may contain a centerline model of at least one hollow organ of the examination subject. In this case, the at least one part of the medical object (e.g., the predefined section) may be arranged intraoperatively in the at least one hollow organ. Further, the transformation rule may include a rule for deformation of at least one centerline of the centerline model.

In one embodiment, the centerline model of the at least one hollow organ may have been determined by a semiautomatic and/or automatic segmentation of a preoperative image of the hollow organ. Further, the determining of the first positioning information may include an arranging of the virtual representation of the medical object along the at least one centerline of the centerline model in accordance with the unit of length. Moreover, the transformation rule may include information relating to a rigid and/or non-rigid and/or global and/or local and/or regional transformation (e.g., deformation) of the at least one centerline of the centerline model for the purpose of minimizing the deviation. For example, the transformation rule may be embodied to deform the at least one centerline of the centerline model when the transformation rule is applied to the preoperative dataset. This enables a spatial course of the at least one centerline to be adjusted anatomically correctly.

In a further embodiment of the method, an intraoperative dataset may be received. In this case, the determining of the second positioning information may include a localizing of the predefined section in the intraoperative dataset.

The receiving of the intraoperative dataset may, for example, include an acquisition thereof and/or a readout thereof from a computer-readable data memory and/or a receiving thereof from a data storage unit (e.g., a database). In one embodiment, the intraoperative dataset may include medical image data. In this case, the intraoperative dataset may be provided by a provisioning unit of the medical imaging device for acquiring the preoperative dataset and/or of a further (e.g., different) medical imaging device.

In one embodiment, the intraoperative dataset may include a two-dimensional (2D) and/or three-dimensional (3D) image (e.g., time-resolved image(s)) of the examination region (e.g., of the hollow organ) and of the predefined section of the medical object arranged therein. In this case, the intraoperative dataset may image the examination region intraoperatively (e.g., while the medical object is at least partially arranged in the examination region). The intraoperative dataset may be registered with the coordinate system of the examination subject and/or with that of the medical imaging device for acquiring the intraoperative dataset. Further, the intraoperative dataset and the preoperative dataset may be registered. Localizing the predefined section in the intraoperative dataset may in this case include identifying (e.g., segmenting and/or annotating) image elements of the intraoperative dataset. The image elements image the predefined section. For example, the predefined section may be identified in the intraoperative dataset based on a contour and/or marker structure of the predefined section. Localizing the predefined section in the intraoperative dataset may be carried out manually (e.g., by annotation) and/or semiautomatically and/or automatically. Further, the predefined section may be localized relative to the coordinate system of the examination subject and/or of the medical imaging device for acquiring the intraoperative dataset. Also (e.g., in addition to the spatial position of the predefined section), an orientation and/or a pose of the predefined section may be determined based on the intraoperative dataset. A spatial course of the predefined section may be determined for this purpose based on the intraoperative dataset. This enables the second positioning information containing information relating to the spatial position and/or orientation and/or pose (e.g., current) of the predefined section in the examination region of the examination subject to be determined.

The embodiment may enable the second positioning information to be determined particularly precisely.

In a further embodiment of the method, a spatial course of the predefined section may be identified in the intraoperative dataset. Further, the determining of the transformation rule may include a minimizing of a further deviation between the at least one centerline and the spatial course of the predefined section.

In this case, identifying the spatial course of the predefined section in the intraoperative dataset may include identifying (e.g., segmenting) image elements of the intraoperative dataset. The image elements image the predefined section. Further, the spatial course of the predefined section may be identified in the intraoperative dataset based on a spatial course and/or a spatial arrangement of a contour and/or a marker structure of the predefined section that is imaged in the intraoperative dataset.

Determining the transformation rule may also include a minimizing of the further deviation between the at least one centerline (e.g., the virtual representation of the predefined section) and the identified spatial course of the predefined section. In this case, the transformation rule may include information relating to a rigid and/or non-rigid and/or global and/or local and/or regional transformation (e.g., deformation) of the at least one centerline. For example, the transformation rule may be embodied to adjust a spatial course of the at least one centerline to fit the spatial course of the predefined section when the transformation rule is applied to the preoperative dataset. An accurate deformation correction that is at the same time close to reality may be realized by this.

In a further embodiment of the method, the intraoperative dataset may contain a projection image of the examination subject. Further, the spatial course of the predefined section in the projection image may be identified by a deformation model of the medical object.

The projection image may contain an image (e.g., two-dimensional) of the medical object at least partially arranged in the examination region (e.g., of the predefined section) along at least one projection direction (e.g., angulation). For example, the projection image may be an X-ray projection image.

The deformation model of the medical object may include information (e.g., a physical boundary condition) relating to the deformability and/or rigidity and/or elasticity and/or torsional strength (e.g., section-specific) of the medical object (e.g., of the predefined section). In this case, the deformation model may be spatially resolved (e.g., three-dimensionally) at least along the longitudinal extension direction of the medical object.

Identifying the spatial course of the predefined section may include a virtual arranging of the virtual representation of the predefined section along the 2D course of the predefined section imaged in the intraoperative dataset (e.g., in the projection image). In this case, the spatial course of the virtual representation of the predefined section may be constrained by the deformation model (e.g., as a boundary condition of an optimization). This enables depth information relating to the spatial course of the predefined section to be estimated in 3D (e.g., in a physically consistent manner).

In a further embodiment of the method, the deformation model may be based on a material parameter and/or an operating parameter of the medical object.

The material parameter may include information relating to a deformability (e.g., a plasticity and/or rigidity and/or ductility and/or torsional strength and/or flexibility and/or elasticity) of the medical object. Further, the operating parameter may describe information relating to an operating state (e.g., current) of the medical object. For example, the operating parameter may include information relating to a spatial pose of the medical object (e.g., of the predefined section).

The embodiment may enable an improvement in the identification of the spatial course of the predefined section using the deformation model.

In a further embodiment of the method, the second positioning information may be provided by an acquisition unit for detecting the real positioning of the predefined section.

The acquisition unit may, for example, include an electromagnetic and/or ultrasound-based and/or optical sensor that is embodied to detect (e.g., track) the predefined section. In one embodiment, the acquisition unit may be embodied to detect the real positioning of the predefined section (e.g., the spatial position and/or orientation and/or pose) in a coordinate system of the acquisition unit. Further, the coordinate system of the acquisition unit may be registered with a coordinate system of the examination subject and/or of the medical imaging device for acquiring the preoperative dataset. The acquisition unit may also be embodied to provide the second positioning information relating to the real positioning of the predefined section.

The embodiment may enable a particularly precise (e.g., highly resolved) detection of the real positioning of the predefined section.

The present embodiments relate, in a second aspect, to a system including a mover device, an acquisition unit, and a provisioning unit. In this case, the mover device is embodied to halt and/or to move a medical object arranged at least partially in the mover device in an operating state of the system. Further, at least a part of the medical object is arranged in an examination region of an examination subject in the operating state of the system. The mover device is also embodied to provide length information containing information relating to a length of the part of the medical object arranged in the examination region. In addition, the provisioning unit is embodied to receive a preoperative dataset containing an image and/or a model of the examination region of the examination subject. Further, the provisioning unit is embodied to determine first positioning information relating to a virtual positioning of a predefined section of the part of the medical object arranged in the examination region based on the preoperative dataset and the length information. In addition, the acquisition unit is embodied to detect a real positioning of the predefined section. The acquisition unit is also embodied to provide second positioning information relating to the real positioning of the predefined section. Also, the provisioning unit is embodied to determine a transformation rule aimed at minimizing a deviation between the first positioning information and the second positioning information. Further, the provisioning unit is embodied to generate and provide a corrected dataset by applying the transformation rule to the preoperative dataset.

The advantages of the system substantially correspond to the advantages of the method for providing a corrected dataset. Features, advantages, or alternative embodiments mentioned in this regard may equally be applied also to the other subject matters, and vice versa.

In a further embodiment of the system, the acquisition unit may be embodied as a medical imaging device. In this case, the medical imaging device may be embodied to acquire an intraoperative dataset of the examination region. Further, the provisioning unit may be embodied to determine the second positioning information by localizing the predefined section in the intraoperative dataset.

In a further embodiment of the system, the provisioning unit may be further embodied to receive a user input containing a preset value relating to a target positioning and/or movement of the predefined section. In addition, the provisioning unit may be embodied to determine a control preset based on the corrected dataset and the user input. Further, the provisioning unit may be embodied to provide the control preset to the mover device. Further, the mover device may be embodied to move the medical object in accordance with the control preset.

The system may include an input unit for entering the user input (e.g., a keyboard and/or a pointing device and/or an input display and/or a joystick). In this case, the input unit may be embodied to provide the user input to the provisioning unit. The target positioning may specify a spatial position and/or orientation and/or pose (e.g., in relation to the preoperative dataset and/or in relation to the corrected dataset) that the predefined section of the medical object is intended to assume. Further, the user input may specify at least one movement parameter for the movement of the predefined section. The movement parameter may, for example, specify a movement direction and/or a speed for the predefined section.

In one embodiment, the provisioning unit may be embodied to determine the control preset based on the corrected dataset and the user input. In this case, the control preset may include at least one command for effecting a control (e.g., incremental and/or continuous control) of the mover device. For example, the control preset may include at least one command (e.g., a temporal sequence of commands) for specifying a translation and/or rotation (e.g., simultaneous) of the medical object (e.g., of the predefined section) by the mover device. For example, in the event of a target positioning in relation to the preoperative dataset being specified, the provisioning unit may be embodied to determine and/or adjust the control preset based on the corrected dataset and the user input such that the predefined section reaches the target positioning (e.g., in relation to the corrected dataset).

Further, the providing of the control preset to the mover device may include, for example, a storing thereof on a computer-readable storage medium and/or a displaying thereof on a visualization unit and/or a transferring thereof to the mover device. In one embodiment, the provisioning unit may be embodied to translate the control preset and to control the mover device based thereon. The mover device may also be embodied to move the medical object (e.g., translationally and/or rotationally) based on the control preset. In addition, the mover device may be embodied to deform the predefined section of the medical object in a defined manner (e.g., by a Bowden cable inside the medical object).

The present embodiments relate, in a third aspect, to a computer program product including a computer program that may be loaded directly into a memory of a provisioning unit and having program sections for performing all the acts of the method for providing a corrected dataset when the program sections are executed by the provisioning unit. The computer program product may in this case include a piece of software having a source code that still requires to be compiled and linked or that only needs to be interpreted, or an executable software code that has only to be loaded into the provisioning unit in order to execute. The computer program product enables the method for providing a corrected dataset using a provisioning unit to be performed quickly and in an identically repeatable and robust manner. The computer program product is configured such that the computer program product is able to carry out the method acts of the present embodiments using the provisioning unit.

The computer program product is stored, for example, on a computer-readable storage medium or held resident on a network or server, from where the computer program product may be loaded into the processor of a provisioning unit. The processor is directly connected to the provisioning unit or may be embodied as part of the provisioning unit. Control information of the computer program product may also be stored on an electronically readable data medium. The control information of the electronically readable data medium may be embodied such that the control information performs a method according to the present embodiments when the data medium is used in a provisioning unit. Examples of electronically readable data media are a DVD, a magnetic tape, or a USB stick, on which electronically readable control information (e.g., software) is stored. When the control information is read from the data medium and loaded into a provisioning unit, all embodiments of the above-described methods may be performed.

The present embodiments may further relate to a computer-readable storage medium and/or an electronically readable data medium on which program sections that may be read and executed by a provisioning unit are stored in order to perform all the acts of the method for providing a corrected dataset when the program sections are executed by the provisioning unit.

A largely software-based implementation has the advantage that provisioning units already used previously may also be easily upgraded by a software update in order to operate in the manner according to the present embodiments. In addition to the computer program, such a computer program product may, where appropriate, include additional constituent parts such as for example a set of documentation and/or additional components, as well as hardware components, such as, for example, hardware keys (e.g., dongles, etc.) to enable use of the software.

BRIEF DESCRIPTION OF THE DRAWINGS

Exemplary embodiments of the invention are illustrated in the drawings and described in more detail hereinbelow. The same reference characters are used for like features in different figures, in which.

DETAILED DESCRIPTION

Figure 1:
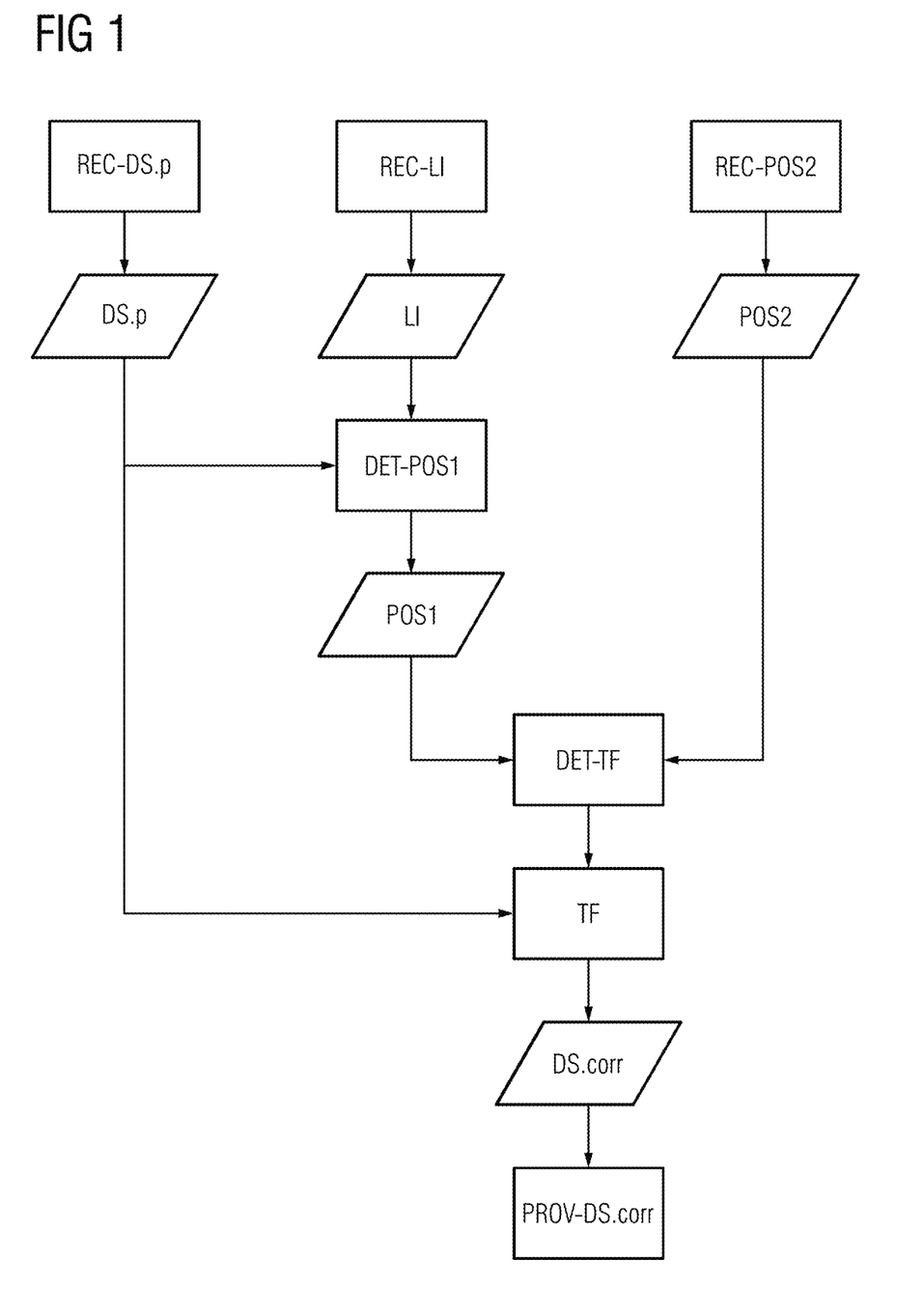
FIGS. 1 and 2 show schematic views of different embodiments of a method for providing a corrected dataset.

FIG. 1 shows an embodiment of a method for providing a corrected dataset PROV-DS.corr in a schematic view. A preoperative dataset DS.p including an image and/or a model of an examination region of an examination subject may be received REC-DS.p. Further, length information LI may be received REC-LI. In this case, at least a part of a medical object may be arranged intraoperatively in the examination region. The medical object may be embodied as a surgical and/or diagnostic instrument (e.g., elongate surgical and/or diagnostic instrument). For example, the medical object may be flexible and/or mechanically deformable. The medical object may be embodied, for example, as a catheter and/or an endoscope and/or a guide wire and/or a stent. The medical object MD may further include a predefined section. In this case, the predefined section may describe, for example, a tip and/or a section (e.g., a distal section) having a marker structure on the medical object.

The length information LI may also include information relating to a length of the part of the medical object arranged in the examination region. Also, first positioning information POS1 relating to a virtual positioning of a predefined section of the part of the medical object arranged in the examination region may be determined DET-POS1 based on the preoperative dataset DS.p and the length information LI. In addition, second positioning information POS2 relating to a real positioning of the predefined section may be received REC-POS2. For example, the second positioning information POS2 may be provided by an acquisition unit for detecting the real positioning of the predefined section. A transformation rule TF for minimizing a deviation between the first positioning information POS1 and the second positioning information POS2 may also be determined DET-TF. Further, the corrected dataset DS.corr may be generated by applying the transformation rule TF to the preoperative dataset DS.p. After this, the corrected dataset DS.corr may be provided PROV-DS.corr.

In one embodiment, a medical operator may be supported by the corrected dataset during medical procedures (e.g., during aortic valve replacement and/or interventions in coronary blood vessels).

In one embodiment, the preoperative dataset DS.p may include planning information relating to a planned movement trajectory of the medical object in the examination region. In this case, the first positioning information POS1 may be determined DET-POS1 also based on the planning information.

Figure 2:
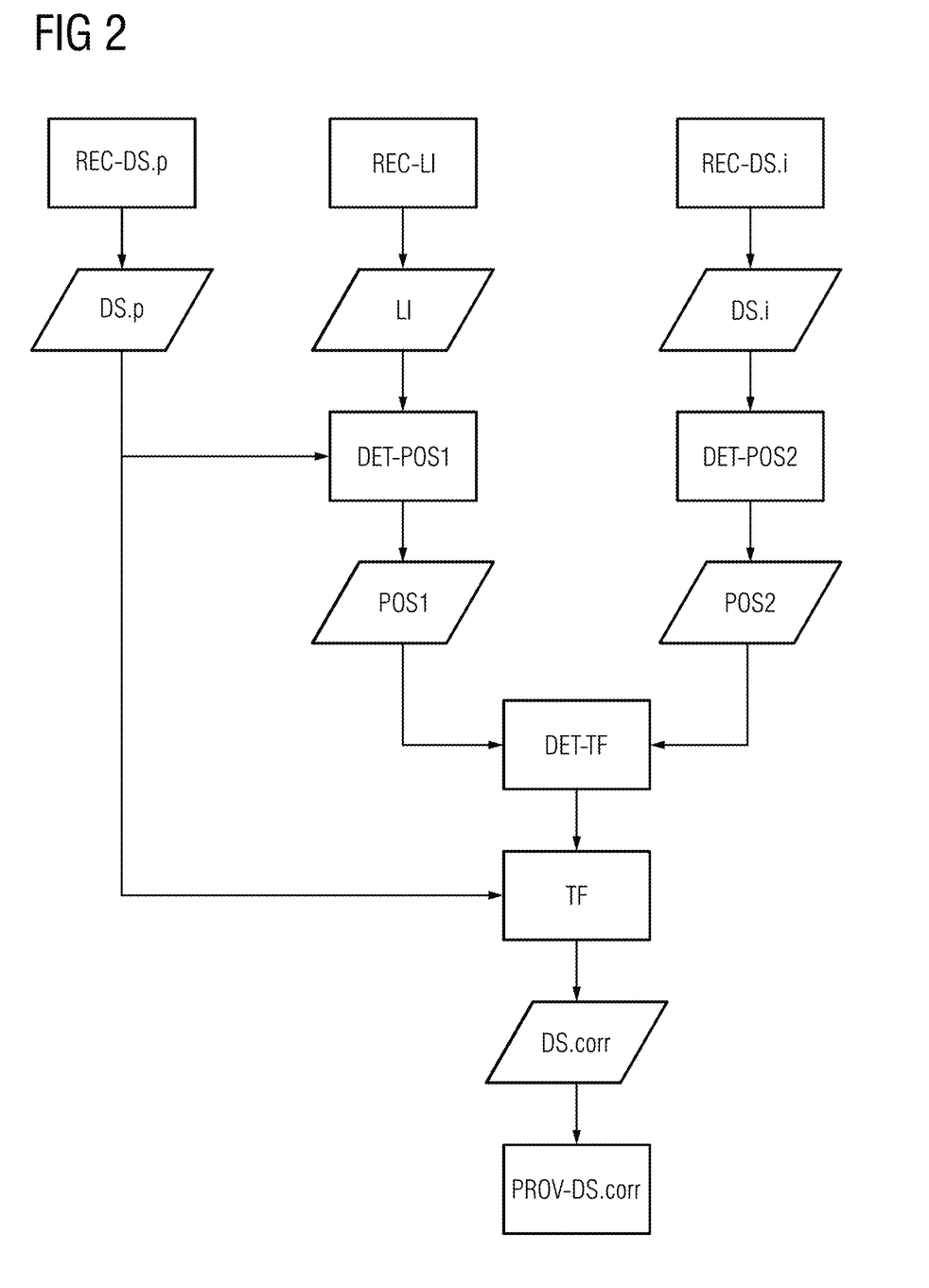

FIG. 2 shows a schematic view of a further embodiment of the method for providing a corrected dataset PROV-DS.corr. In this case, an intraoperative dataset DS.i may be received REC-DS.i. Further, the determining DET-POS2 of the second positioning information POS2 may include a localizing of the predefined section in the intraoperative dataset DS.i.

The preoperative dataset DS.p may further include a centerline model of at least one hollow organ of the examination subject. In this case, the at least one part of the medical object (e.g., the predefined section) may be arranged intraoperatively in the at least one hollow organ. Further, the transformation rule TF may include a rule for the deformation of at least one centerline of the centerline model.

In one embodiment, a spatial course of the predefined section may also be identified in the intraoperative dataset DS.i. In this case, the determining DET-TF of the transformation rule TF may include a minimizing of a further deviation between the at least one centerline and the spatial course of the predefined section.

Figure 3:
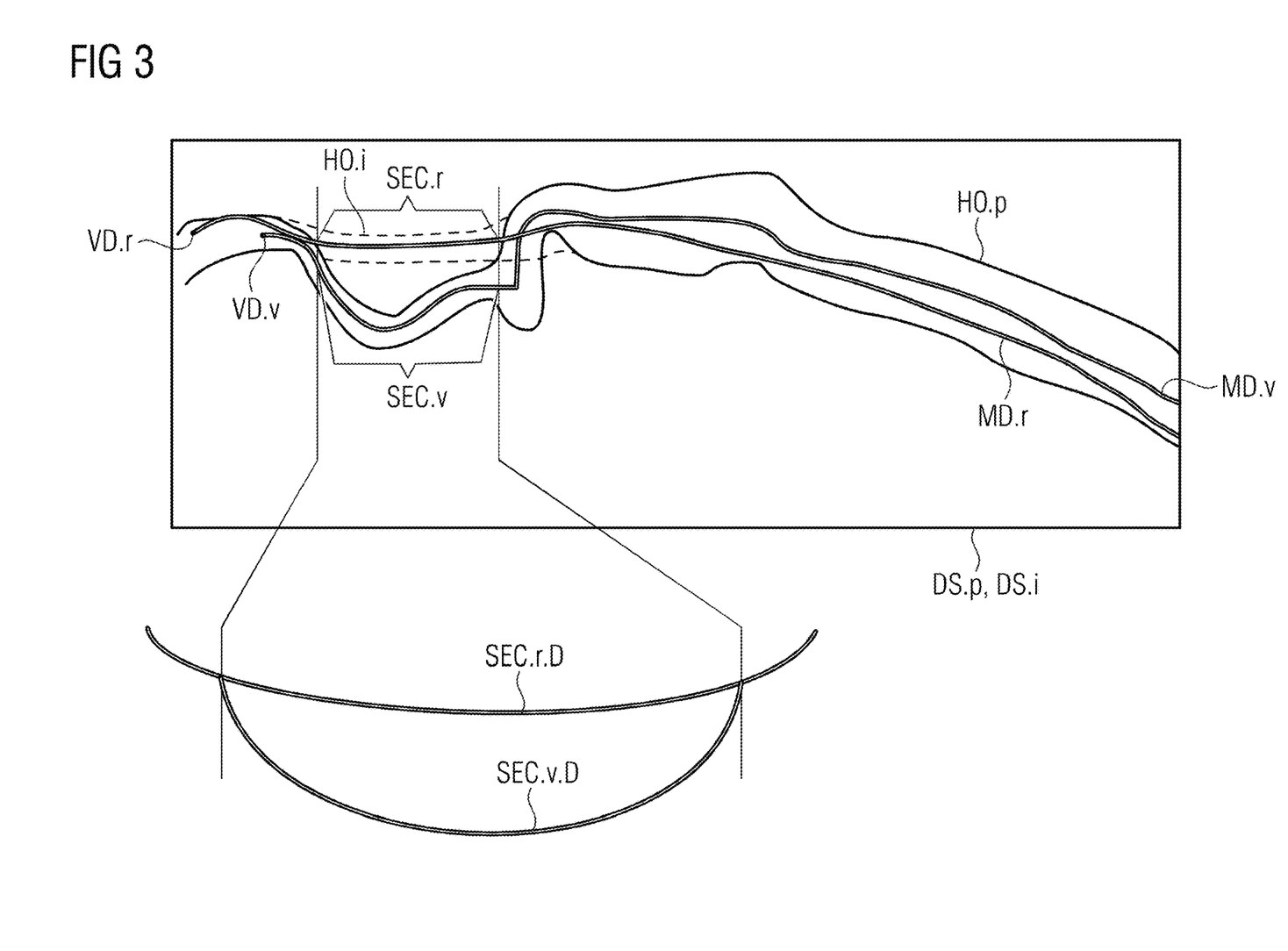
FIG. 3 shows a schematic view of a deviation between a virtual positioning and a real positioning of a predefined section of a medical object.

FIG. 3 shows an exemplary deviation between a virtual positioning and a real positioning of the predefined section VD of the medical object MD in a schematic view. In this case, the preoperative dataset DS.p may contain an image and/or a model of a hollow organ HO.p of the examination subject. Further, the determining DET-POS1 of the first positioning information POS1 may include an arranging of a virtual representation of the medical object MD.v in the preoperative dataset DS.p. If the preoperative dataset DS.p includes a centerline model (not shown here), the virtual representation of the medical object MD.v may be arranged along at least one centerline of the centerline model. Further, the first positioning information POS1 relating to the virtual positioning of the predefined section of the medical object MD may be determined at least in relation to the preoperative dataset.

The intraoperative dataset DS.i may further include a projection image of the examination region (e.g., of the hollow organ). The projection image may include a 2D image of the medical object MD arranged intraoperatively at least partially in the examination region (e.g., of the predefined section VD) along at least one projection direction (e.g., angulation). A graphical overlaying of the preoperative dataset DS.p with the intraoperative dataset DS.i is illustrated schematically in FIG. 3. The overlaid illustration may include a deviation between a virtual end position VD.v of the virtual representation of the predefined section VD and the real end position VD.r of the predefined section VD. The overlaid illustration may further include a deviation between the preoperatively imaged 2D course of the hollow organ HO.p and the intraoperatively imaged 2D course of the hollow organ HO.i.

In order to illustrate the identification of the spatial course of the predefined section VD, the 2D course SEC.v or SEC.r and the 3D course SEC.v.D or SEC.r.D, respectively, are shown schematically in FIG. 3 in each case for a section of the virtual representation of the medical object and the intraoperative image of the medical object.

In this case, the difference between the virtual end position VD.v of the virtual representation of the predefined section VD and the real end position VD.r of the predefined section VD may be caused by a deformation of the medical object MD in depth (e.g., in relation to the projection direction). In one embodiment, the spatial course of the predefined section VD may be identified in the intraoperative dataset DS.i by a deformation model of the medical object MD. The deformation model may be based on a material parameter and/or an operating parameter of the medical object MD. For example, the deformation model of the medical object may include information (e.g., a physical boundary condition) relating to the deformability and/or rigidity and/or elasticity and/or torsional strength (e.g., section-specific) of the medical object MD (e.g., of the predefined section VD). In this case, the deformation model may be resolved (e.g., three-dimensionally) at least along the longitudinal extension direction of the medical object MD.

The identifying of the spatial course of the predefined section VD may include a virtual arranging of the virtual representation of the medical object MD.v along the 2D course of the medical object MD.r imaged in the intraoperative dataset DS.i. Further, the spatial course of the at least one centerline of the hollow organ HO.p along which the virtual representation of the medical object MD.v is arranged may be described in the section SEC.v.D under consideration of the hollow organ HO.p in accordance with a curvature rule (e.g., as a symmetrical parabola):

$$y_1 = A_1 \cdot x^2 \quad (1)$$

Here, the section SEC.v.D under consideration of the hollow organ may be normalized to an interval [−1,1], and A may be a parameter of the parabola. The parabola may also have an arc length $L_1$, where $$L_1 = \sqrt{1 + 4A_1^2} + \frac{\ln(2A_1 + \sqrt{1 + 4A_1^2})}{4A_1} \quad (2)$$

In order to minimize the deviation between the at least one centerline and the real spatial course of the predefined section SEC.r.D, a parameter $A_2$ for a further parabola $$y_2 = A_2 \cdot x^2 \quad (3)$$

having a shortened arc length $$L_2 = L_1 - D \quad (4)$$

may be determined, where D describes a difference between the virtual end position VD.v of the virtual representation of the predefined section VD and the real end position VD.r of the predefined section VD:

$$D = |VD.v - VD.r| \quad (5)$$

In one embodiment, the transformation rule TF may be determined such that the virtual spatial course of the at least one centerline of the hollow organ HO.p along which the virtual representation of the medical object MD.v is arranged in the section SEC.v.D under consideration follows the further parabola $y_2$ in the corrected dataset DS.corr.

Alternatively or in addition, the spatial course of the at least one centerline of the hollow organ HO.p along which the virtual representation of the medical object MD.v is arranged in the section SEC.v.D under consideration of the hollow organ HO.p may be described by a polynomial, where the polynomial may have a polynomial degree greater than or equal to 2 (e.g., 5).

Figure 4:
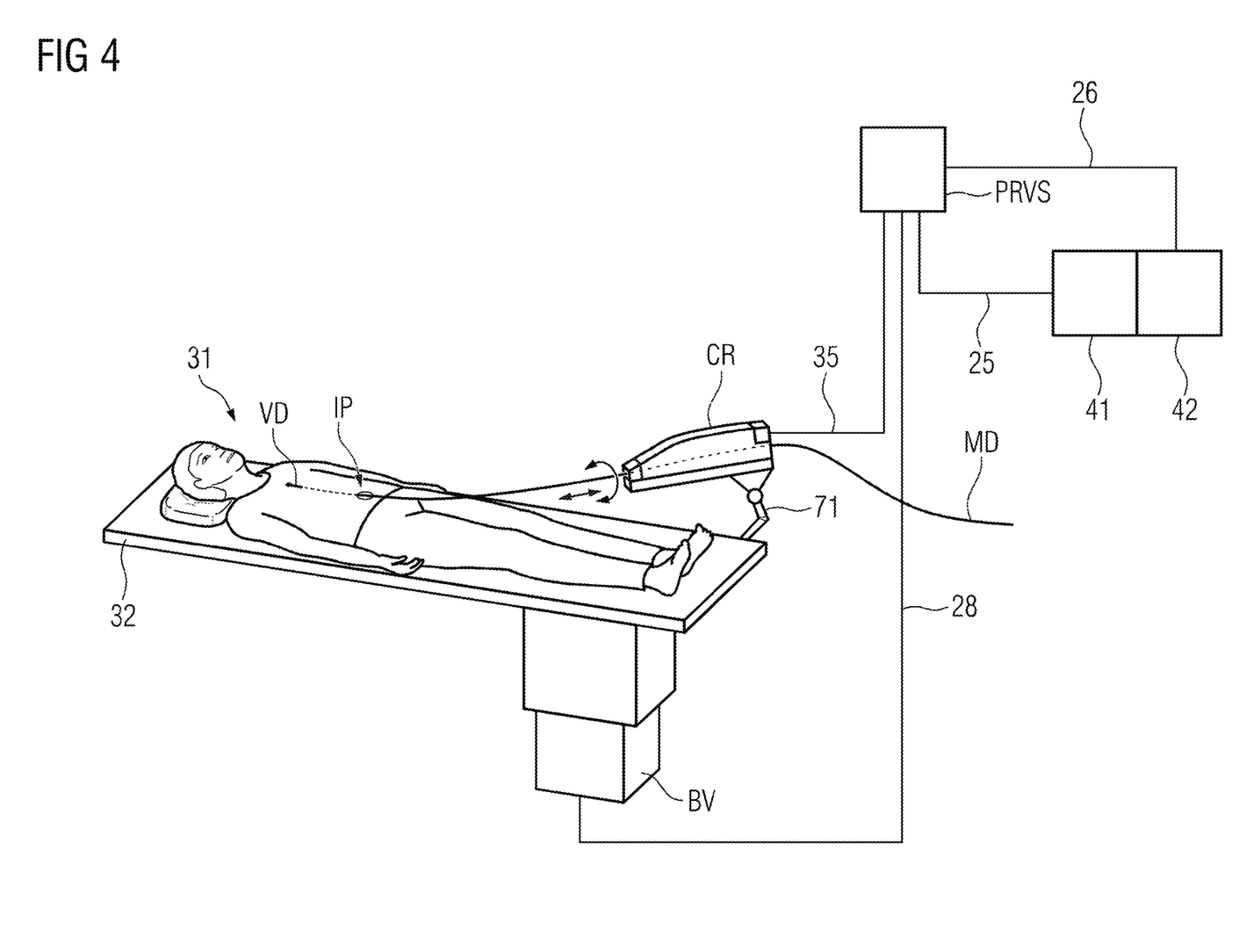
FIGS. 4 and 5 show schematic views of different embodiments of a system.

FIG. 4 shows a schematic view of one embodiment of a system including a mover device CR, an acquisition unit (not shown here), and a provisioning unit PRVS.

The mover device CR may be embodied, for example, as a catheter robot (e.g., to allow remote manipulation of the medical object MD). The predefined section VD of the medical object MD may be arranged at least partially in an examination region of an examination subject 31 (e.g., in a hollow organ) in an operating state of the system. In the operating state of the system, the medical object MD may, for example, be introduced via an introducer sheath at an insertion point IP into the examination subject 31 disposed on the patient support and positioning device 32 (e.g., into a hollow organ of the examination subject 31). In this case, the hollow organ may, for example, contain a vessel section in which the predefined section VD is at least partially arranged in the operating state of the system. Further, the patient support and positioning device 32 may be at least partially movable. For this purpose, the patient support and positioning device 32 may include a mover unit BV that is controllable by a signal 28 from the provisioning unit PRVS.

The mover device CR may also be fixedly secured to the patient support and positioning device 32 by a securing element 71 (e.g., a stand and/or a robotic arm) so as to, for example, be movable. The mover device CR may be embodied to move the medical object MD, which is arranged at least partially in the mover device CR in the operating state of the system, translationally at least along a longitudinal extension direction of the medical object MD. The mover device CR may be further embodied to rotate the medical object MD around the longitudinal extension direction. Alternatively or in addition, the mover device CR may be embodied to control a movement of at least a part of the medical object MD (e.g., a distal section and/or a tip of the medical object MD, such as the predefined section VD). In addition, the mover device CR may be embodied to deform the predefined section VD of the medical object MD in a defined manner (e.g., via a Bowden cable inside the medical object MD).

The system may further include an input unit 42 (e.g., a keyboard) and/or a visualization unit 41 (e.g., a monitor and/or a display). The input unit 42 may be integrated into the visualization unit 41 (e.g., in the case of a capacitive and/or resistive input display).

The visualization unit 41 may be embodied to display information and/or graphical representations of information of the device and/or of the medical C-arm X-ray device 37 and/or of the provisioning unit PRVS and/or of other components. For this purpose, the provisioning unit PRVS may, for example, send a signal 25 to the visualization unit 41. The input unit 42 may be embodied to register a user input and to provide a signal 26 as a function of the user input. Further, the visualization unit 41 may be embodied to display information and/or graphical representations of information of the system and/or of the provisioning unit PRVS and/or of other components (e.g., a graphical representation of the preoperative and/or intraoperative and/or corrected dataset). For this purpose, the provisioning unit PRVS may, for example, send a signal 25 to the visualization unit 41.

The provisioning unit PRVS may be embodied to receive the user input including a preset value relating to a target positioning and/or movement of the predefined section VD (e.g., based on the signal 26 from the input unit 42). The provisioning unit PRVS may be further embodied to determine a control preset (e.g., a control command) based on the corrected dataset DS.corr and the user input. The provisioning unit PRVS may be further embodied to provide the control preset to the mover device CR (e.g., by the signal 35). The mover device CR is embodied to receive the control preset based on the signal 35. The mover device CR may be further embodied to move the medical object MD in accordance with the control preset.

Figure 5:
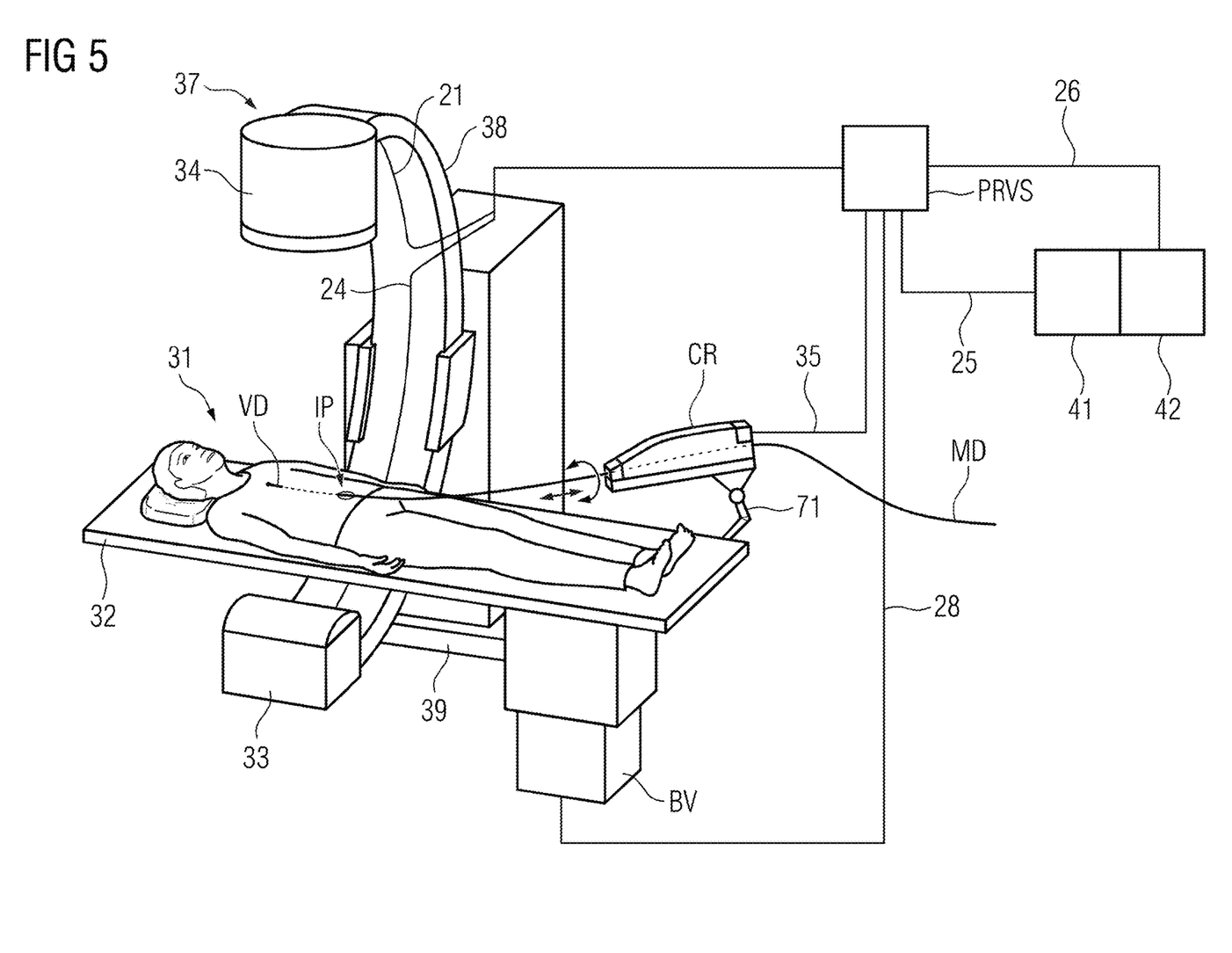

FIG. 5 shows a schematic view of a further embodiment of a proposed system. In this case, the acquisition unit may be embodied as a medical imaging device (e.g., as a medical C-arm X-ray device 37). Further, the medical C-arm X-ray device 37 may be embodied to acquire the intraoperative dataset DS.i of the examination region. Further, the provisioning unit PRVS may be embodied to determine the second positioning information POS2 by localizing the predefined section VD in the intraoperative dataset DS.i.

The medical imaging device, in the form of a medical C-arm X-ray device 37 in the exemplary embodiment, may include a detector 34 (e.g., an X-ray detector) and an X-ray source 33. In order to acquire the intraoperative dataset DS.i, the arm 38 of the medical C-arm X-ray device 37 may be mounted so as to be movable around one or more axes. Further, the medical C-arm X-ray device 37 may include a further mover unit 39 (e.g., a wheel system and/or a rail system and/or a robotic arm) that enables the medical C-arm X-ray device 37 to execute movements in space. The detector 34 and the X-ray source 34 may be movably secured to a common C-arm 38 in a defined arrangement.

The provisioning unit PRVS may also be embodied to control a positioning of the medical C-arm X-ray device 37 relative to the examination subject 31 such that the predefined section VD of the medical object MD is imaged in the intraoperative dataset DS.i acquired by the medical C-arm X-ray device 37. The positioning of the medical C-arm X-ray device 37 relative to the examination subject 31 may, for example, include a positioning of the defined arrangement of X-ray source 33 and detector 34 (e.g., of the C-arm 38) around one or more spatial axes.

In order to acquire the intraoperative dataset DS.i of the examination subject 31, the provisioning unit PRVS may send a signal 24 to the X-ray source 33. The X-ray source 33 may thereupon transmit an X-ray beam (e.g., a cone beam and/or fan beam and/or parallel beam). When the X-ray beam is incident on a surface of the detector 34 following an interaction with the examination region to be imaged of the examination subject 31, the detector 34 may send a signal 21 to the provisioning unit PRVS. The provisioning unit PRVS may receive the intraoperative dataset DS.i, for example, based on the signal 21.

Figure 6:
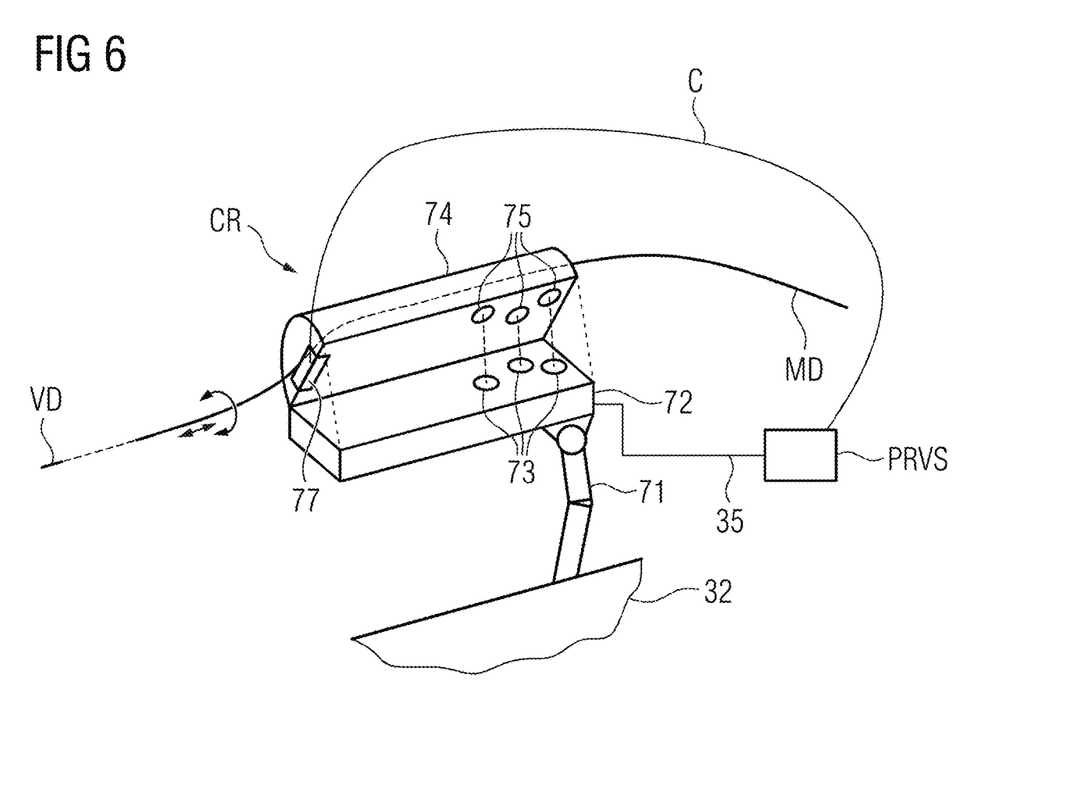
FIG. 6 shows a schematic view of one embodiment of a mover device.

FIG. 6 shows a schematic view of the mover device CR for robotically moving the medical object MD. The mover device CR may include a securing element 71 (e.g., a movable and/or maneuverable securing element). The mover device CR may further include a cassette element 74 that is embodied to accommodate at least a part of the medical object MD. The mover device CR may further include a mover element 72 that is fixedly mounted to the securing element 71 (e.g., a stand and/or a robotic arm). Further, the securing element 71 may be embodied to secure the mover element 72 to the patient support and positioning device 32 (e.g., so as to be movable). Further, the mover element 72 may include at least one (e.g., three) actuator element(s) 73 (e.g., an electric motor). The provisioning unit PRVS is embodied to control the at least one actuator element 73. In one embodiment, the cassette element 74 may be couplable (e.g., mechanically and/or electromagnetically and/or pneumatically) to the mover element 72 (e.g., to the at least one actuator element 73). In this case, the cassette element 74 may further include at least one transmission element 75 that is movable as a result of the coupling between the cassette element 74 and the mover element 72 (e.g., the at least one actuator element 73). For example, the at least one transmission element 75 may be movably coupled to the at least one actuator element 73. The transmission element 75 may be further embodied to transmit a movement of the actuator element 73 to the medical object MD such that the medical object MD is moved along a longitudinal extension direction of the medical object MD and/or that the medical object MD is rotated around the longitudinal extension direction. The at least one transmission element 75 may include, for example, a roller and/or drum and/or shield and/or shearing plate.

In one embodiment, the mover element 72 may include a plurality of (e.g., independently controllable) actuator elements 73. Further, the cassette element 74 may include a plurality of transmission elements 75 (e.g., at least one movably coupled transmission element 75 for each of the actuator elements 73). This may facilitate a movement (e.g., independent and/or simultaneous) of the medical object MD along different degrees of freedom.

Further, the mover device CR (e.g., the at least one actuator element 73) may be controllable by the signal 35 from the provisioning unit PRVS. By this, the movement of the medical object MD may be controlled (e.g., indirectly) by the provisioning unit PRVS. Further, an orientation and/or position of the mover device CR relative to the examination subject 31 may be adjustable by a movement of the securing element 71.

In addition, the mover device CR may include a sensor unit 77 that is embodied to detect a relative movement of the medical object MD relative to the mover device CR. In this case, the sensor unit 77 may include, for example, an encoder (e.g., a wheel encoder and/or a roller encoder) and/or an optical sensor (e.g., a barcode scanner and/or a laser scanner and/or a camera, and/or an electromagnetic sensor). The sensor unit 77 may, for example, be arranged at least partially integrated into the mover element 72 (e.g., the at least one actuator element 73) and/or into the cassette element 74 (e.g., the at least one transmission element 75). The sensor unit 77 may be embodied, for example, to detect the relative movement of the medical object MD by detecting the medical object MD relative to the mover device CR. Alternatively or in addition, the sensor unit 77 may be embodied to detect a movement and/or change in position of components of the mover device CR; the components are movably coupled to the medical object MD (e.g., the at least one actuator element 73 and/or the at least one transmission element 75).

The mover device may be embodied to provide the length information LI (e.g., the detected relative movement of the medical object MD in relation to the mover device CR) using a signal C from the sensor unit 77 to the provisioning unit PRVS.

The schematic illustrations contained in the described figures do not reflect a scale or proportions of any kind.

The methods described in detail in the foregoing, as well as the illustrated devices, are simply exemplary embodiments that may be modified in the most diverse ways by the person skilled in the art without leaving the scope of the invention. Further, the use of the indefinite articles "a" or "an" does not exclude the possibility that the features in question may also be present more than once. Similarly, the terms "unit" and "element" do not rule out the possibility that the components in question consist of a plurality of cooperating subcomponents that, if necessary, may also be distributed in space.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for providing a corrected dataset, the method comprising:
   receiving a preoperative dataset including an image, a model, or the image and the model of an examination region of an examination subject;
   receiving length information, wherein at least a part of a medical object is arranged intraoperatively in the examination region, and wherein the length information includes information relating to a length of the part of the medical object arranged in the examination region;
   receiving an intraoperative dataset;
   determining first positioning information relating to a virtual positioning of a predefined section of the part of the medical object arranged in the examination region based on the preoperative dataset and the length information;
   receiving, determining, or receiving and determining second positioning information relating to a real positioning of the predefined section;
   determining a transformation rule for minimizing a deviation between the first positioning information and the second positioning information;
   generating the corrected dataset, the generating of the corrected dataset comprising applying the transformation rule to the preoperative dataset; and
   providing the corrected dataset,
   wherein a spatial course of the predefined section is identified in the intraoperative dataset;
   wherein the intraoperative dataset includes a projection image of the examination region, and
   wherein the spatial course of the predefined section is identified in the projection image using a deformation model of the medical object.

2. The method of claim 1, wherein the preoperative dataset includes planning information relating to a planned movement trajectory of the medical object in the examination region, and
   wherein determining the first positioning information comprises determining the first positioning information also based on the planning information.

3. The method of claim 1, wherein a positioning of the predefined section of the medical object in the examination region has taken place by a mover device prior to the start of the method,
   wherein the mover device is configured to halt, move, or halt and move the medical object at least partially arranged in the mover device, and
   wherein the length information is provided by the mover device.

4. The method of claim 1, wherein the preoperative dataset includes a centerline model of at least one hollow organ of the examination subject,
   wherein the at least one part of the medical object is arranged intraoperatively in the at least one hollow organ, and
   wherein the transformation rule comprises a rule for deformation of at least one centerline of the centerline model.

5. The method of claim 2,
   wherein determining the second positioning information comprises localizing the predefined section in the intraoperative dataset.

6. The method of claim 5,
   wherein determining the transformation rule comprises minimizing a further deviation between the at least one centerline and the spatial course of the predefined section.

7. The method of claim 1, wherein the deformation model is based on a material parameter, an operating parameter, or the material parameter and the operating parameter of the medical object.

8. The method of claim 1, wherein the second positioning information is provided by an acquisition unit for detecting the real positioning of the predefined section.

9. A system comprising:
   a mover device;
   an acquisition unit; and
   a provisioning unit,
   wherein the mover device is configured to halt, move, or halt and move a medical object at least partially arranged in the mover device in an operating state of the system,
   wherein at least a part of the medical object is arranged in an examination region of an examination subject in the operating state of the system,
   wherein the mover device is configured to provide length information including information relating to a length of the part of the medical object arranged in the examination region,
   wherein the provisioning unit is configured to:
      receive a preoperative dataset including an image, a model, or the image and the model of the examination region of the examination subject;
      receive an intraoperative dataset;
      determine first positioning information relating to a virtual positioning of a predefined section of the part of the medical object arranged in the examination region based on the preoperative dataset and the length information,
   wherein the acquisition unit is configured to:
      detect a real positioning of the predefined section; and
      provide second positioning information relating to the real positioning of the predefined section, and
   wherein the provisioning unit is further configured to:
      determine a transformation rule for minimizing a deviation between the first positioning information and the second positioning information;
      generate a corrected dataset, the generation of the corrected dataset comprising application of the transformation rule to the preoperative dataset; and
      provide the corrected dataset,
   wherein a spatial course of the predefined section is identified in the intraoperative dataset;
   wherein the intraoperative dataset includes a projection image of the examination region, and
   wherein the spatial course of the predefined section is identified in the projection image using a deformation model of the medical object.

10. The system of claim 9, wherein the acquisition unit is configured as a medical imaging device,
    wherein the medical imaging device is configured to acquire the intraoperative dataset of the examination region, and
    wherein the provisioning unit is further configured to determine the second positioning information, the determination of the second positioning information comprising localization of the predefined section in the intraoperative dataset.

11. The system of claim 9, wherein the provisioning unit is further configured to:
receive a user input including a preset value relating to a target positioning, movement of the predefined section, or a combination thereof;
determine a control command based on the corrected dataset and the user input; and
provide the control command to the mover device,
wherein the mover device is further configured to move the medical object in accordance with the control command.

12. In a non-transitory computer-readable storage medium that stores instructions executable by one or more processors to provide a corrected dataset, the instructions comprising:
receiving a preoperative dataset including an image, a model, or the image and the model of an examination region of an examination subject;
receiving length information, wherein at least a part of a medical object is arranged intraoperatively in the examination region, and wherein the length information includes information relating to a length of the part of the medical object arranged in the examination region;
receiving an intraoperative dataset;
determining first positioning information relating to a virtual positioning of a predefined section of the part of the medical object arranged in the examination region based on the preoperative dataset and the length information;
receiving, determining, or receiving and determining second positioning information relating to a real positioning of the predefined section;
determining a transformation rule for minimizing a deviation between the first positioning information and the second positioning information;
generating the corrected dataset, the generating of the corrected dataset comprising applying the transformation rule to the preoperative dataset; and
providing the corrected dataset,
wherein a spatial course of the predefined section is identified in the intraoperative dataset;
wherein the intraoperative dataset includes a projection image of the examination region, and
wherein the spatial course of the predefined section is identified in the projection image using a deformation model of the medical object.

13. The non-transitory computer-readable storage medium of claim 12, wherein the preoperative dataset includes planning information relating to a planned movement trajectory of the medical object in the examination region, and
wherein determining the first positioning information comprises determining the first positioning information also based on the planning information.

14. The non-transitory computer-readable storage medium of claim 12, wherein a positioning of the predefined section of the medical object in the examination region has taken place by a mover device prior to the start of the method,
wherein the mover device is configured to halt, move, or halt and move the medical object at least partially arranged in the mover device, and
wherein the length information is provided by the mover device.

15. The non-transitory computer-readable storage medium of claim 12, wherein the preoperative dataset includes a centerline model of at least one hollow organ of the examination subject,
wherein the at least one part of the medical object is arranged intraoperatively in the at least one hollow organ, and
wherein the transformation rule comprises a rule for deformation of at least one centerline of the centerline model.

16. The non-transitory computer-readable storage medium of claim 13,
wherein determining the second positioning information comprises localizing the predefined section in the intraoperative dataset.

17. The non-transitory computer-readable storage medium of claim 16,
wherein determining the transformation rule comprises minimizing a further deviation between the at least one centerline and the spatial course of the predefined section.

* * * * *